(12) United States Patent
Lang et al.

(10) Patent No.: US 9,880,798 B2
(45) Date of Patent: Jan. 30, 2018

(54) METHOD AND ELECTRONIC DEVICE FOR CONTROLLING DISPLAYED CONTENT BASED ON OPERATIONS

(71) Applicant: Lenovo (Beijing) Co., Ltd., Beijing (CN)

(72) Inventors: Jian Lang, Beijing (CN); Xiaobing Guo, Beijing (CN); Xiaoping Zhang, Beijing (CN); Chunlong Yang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/671,038

(22) Filed: Mar. 27, 2015

(65) Prior Publication Data

US 2016/0110147 A1 Apr. 21, 2016

(30) Foreign Application Priority Data

Oct. 17, 2014 (CN) .......................... 2014 1 0555098

(51) Int. Cl.
G06F 3/14 (2006.01)
G06F 3/0485 (2013.01)
G06F 3/01 (2006.01)

(52) U.S. Cl.
CPC ............. *G06F 3/14* (2013.01); *G06F 3/013* (2013.01); *G06F 3/0485* (2013.01); *G09G 2320/0261* (2013.01); *G09G 2340/045* (2013.01); *G09G 2340/0464* (2013.01); *G09G 2354/00* (2013.01); *G09G 2356/00* (2013.01)

(58) Field of Classification Search
None
See application file for complete search history.

(56) References Cited

U.S. PATENT DOCUMENTS

2006/0001647 A1* 1/2006 Carroll .................. G06F 3/0304
345/156
2010/0271549 A1* 10/2010 Kuwabara ............... G06T 11/60
348/564
2013/0169560 A1* 7/2013 Cederlund .............. G06F 3/013
345/173

(Continued)

FOREIGN PATENT DOCUMENTS

WO WO-2013168171 A1 11/2013

OTHER PUBLICATIONS

First German Office Action regarding Application No. 102015104763.2 dated Jun. 30, 2016. English translation provided by German Patent & Trademark Office.

*Primary Examiner* — Edward Martello
(74) *Attorney, Agent, or Firm* — Harness, Dickey & Pierce, P.L.C.

(57) ABSTRACT

A display method and an electronic device are disclosed in the application. The method includes: detecting, by a first acquisition unit, operation data, while displaying a first part of an output content on a display unit; acquiring, by a second acquisition unit, first focus data of an object user within a set range watching the output content, wherein the focus data indicates a position of the display unit corresponding to a focus of the object user; and displaying a second part of the output content, based on the operation data and the first focus data, wherein the second part is different from the first part.

9 Claims, 3 Drawing Sheets

(56) References Cited

U.S. PATENT DOCUMENTS

| | | | |
|---|---|---|---|
| 2014/0089833 A1* | 3/2014 | Hwang | G06F 3/04817 |
| | | | 715/769 |
| 2014/0232640 A1 | 8/2014 | Kempinski | |
| 2014/0268054 A1 | 9/2014 | Olsson et al. | |
| 2014/0292665 A1* | 10/2014 | Lathrop | G06F 3/013 |
| | | | 345/173 |
| 2015/0002392 A1 | 1/2015 | Kempinski | |
| 2015/0066165 A1* | 3/2015 | Everette | G06F 3/0482 |
| | | | 700/83 |
| 2015/0138244 A1* | 5/2015 | George-Svahn | G06F 3/0482 |
| | | | 345/661 |
| 2015/0149956 A1 | 5/2015 | Kempinski et al. | |
| 2015/0185834 A1* | 7/2015 | Wingrove | B60K 37/06 |
| | | | 345/156 |

\* cited by examiner

METHOD AND ELECTRONIC DEVICE FOR CONTROLLING DISPLAYED CONTENT BASED ON OPERATIONS

This application claims priority to Chinese Patent Application No. 201410555098.7, entitled "DISPLAY METHOD AND ELECTRONIC DEVICE", filed with the Chinese Patent Office on Oct. 17, 2014, which is incorporated by reference in its entirety herein.

FIELD

The present disclosure relates to the field of electronic technology, and in particular to a display method and an electronic device.

BACKGROUND

In recent years, with rapid development of information technology, requirements of various users on informatization application is increasing, coverage of an information network is becoming wider and wider, and a utilization rate of the network is improved steadily. With a combination of the computer network technique and various important service systems, such as an external portal site system, an internal site system, an office automation system, a marketing management system, a distribution management system, a financial management system and a production management system, paperless office can be realized, thereby improving work efficiency effectively. With the prevailing paperless office, an important way to improve the work efficiency is to improve efficiency in reading an electronic document.

During implementation of technical solutions in embodiments of the disclosure, the applicant of the disclosure finds a condition as follows.

To perform some operations with inertial characteristics (such as page turning or screen scrolling), a user generally performs rolling control on a read content by an up key or a down key in the keyboard or a roller of a mouse. However, in a case that the read content crosses a long range, the roller of the mouse needs to be rolled multiple times continuously, or the up key or the down key needs to be pressed multiple times continuously. The user can accept the variation of the displayed content only to a certain extent. Asynchronization between reading of the user and variation of the displayed content may occur when the displayed content is adjusted over a long range by the roller of the mouse, the up key or the down key in the keyboard, thus the operation performed by the user become invalid.

SUMMARY

A display method and an electronic device are provided in the disclosure, to prevent an operation performed by a user becoming invalid due to the asynchronization between the reading of the user and the variation of the displayed content when the displayed content is adjusted over a long range by the roller of the mouse, the up key or the down key in the keyboard.

A display method is provided in the disclosure, which includes:

detecting, by a first acquisition unit, operation data, while a first part of an output content is displayed on a display unit;

acquiring, by a second acquisition unit, first focus data of an object user within a set range watching the output content, wherein the focus data indicates a position of the display unit corresponding to a focus of the object user; and displaying a second part of the output content based on the operation data and the first focus data, wherein the second part is different from the first part.

Optionally, the displaying a second part of the output content based on the operation data and the first focus data may include:

determining, based on the first focus data, a first position of the display unit corresponding to the focus of the object user; and displaying the second part of the output content, based on the first position and the operation data.

Optionally, the displaying the second part of the output content, based on the first position and the operation data, may include:

determining a first distance between the first position and a boundary of the display unit; and displaying the second part of the output content, based on the operation data and the distance.

Optionally, the displaying the second part of the output content, based on the operation data and the distance, may include:

determining a first adjustment range corresponding to the first distance based on a preset correspondence between the distance and the adjustment range, wherein the adjustment range indicates a difference between the second part and the first part;

determining the second part from the content to be displayed based on the first adjustment range and the first part; and displaying the second part of the output content based on the operation data.

Optionally, the correspondence between the distance and the adjustment range may include a directly-proportional relation between the distance and the adjustment range.

Optionally, the displaying a second part of the output content, based on the operation data and the first focus data, may include:

setting a display mark, based on the first focus data, wherein the display mark distinguishes the second part from the first part; and displaying the second part of the output content and the display mark, based on the operation data.

Optionally, the setting a display mark, based on the first focus data, may include:

determining a third position of the display unit corresponding to the first focus data; and providing the display mark at the third position.

An electronic device is provided in the disclosure, and the device includes:

a first detection module, configured to detect, by a first acquisition unit, operation data while a first part of an output content is displayed on a display unit;

a second detection module, configured to acquire, by a second acquisition unit, first focus data of an object user within a set range watching the output content, wherein the focus data indicates a position of the display unit corresponding to a focus of the object user; and an output module, configured to display a second part of the output content based on the operation data and the first focus data, wherein the second part is different from the first part.

Optionally, the output module may be configured to:

determine a first position of the display unit corresponding to the focus of the object user based on the first focus data; and display the second part of the output content based on the first position and the operation data.

Optionally, the output module may include:

a positioning unit, configured to determine the first position of the display unit corresponding to the focus of the object user based on the first focus data; and an adjustment unit, configured to determine a first distance between the first position and a boundary of the display unit and display, based on the operation data and the distance, the second part of the output content.

Optionally, the output module may include:

a setting unit, configured to set a display mark based on the first focus data, wherein the display mark distinguishes the second part from the first part; and an identification unit, configured to display the second part of the output content and the display mark based on the operation data.

Another electronic device is provided in the disclosure, and the device includes:

a first acquisition unit, configured to acquire operation data while a first part of an output content is displayed on a display unit;

a second acquisition unit, configured to acquire first focus data of an object user within a set range watching the output content, wherein the focus data indicates a position of the display unit corresponding to a focus of the object user; and a processor, configured to control the display unit to display a second part of the output content based on the operation data and the first focus data, wherein the second part is different from the first part.

Optionally, the processor may be configured to:

determine, based on the first focus data, a first position of the display unit corresponding to the focus of the object user; and display the second part of the output content based on the first position and the operation data.

One or two of the above technical solutions has at least following technical effects.

In the method provided in an embodiment of the disclosure, after the operation data is detected by the first acquisition unit (that is, the operation with inertial characteristics is detected), the focus data of the user is further detected, where the focus data indicates a position of a displayed content watched by the user. The first focus data needs to be taken into consideration when the displayed content is adjusted in the device based on the operation data. That is to say, reference needs to be made to the focus data when the displayed content is adjusted in the device, so that the adjusted displayed content is synchronized with the reading or the sight line of the user, thereby preventing the operation of the user from becoming invalid.

DETAILED DESCRIPTION

Figure 1:
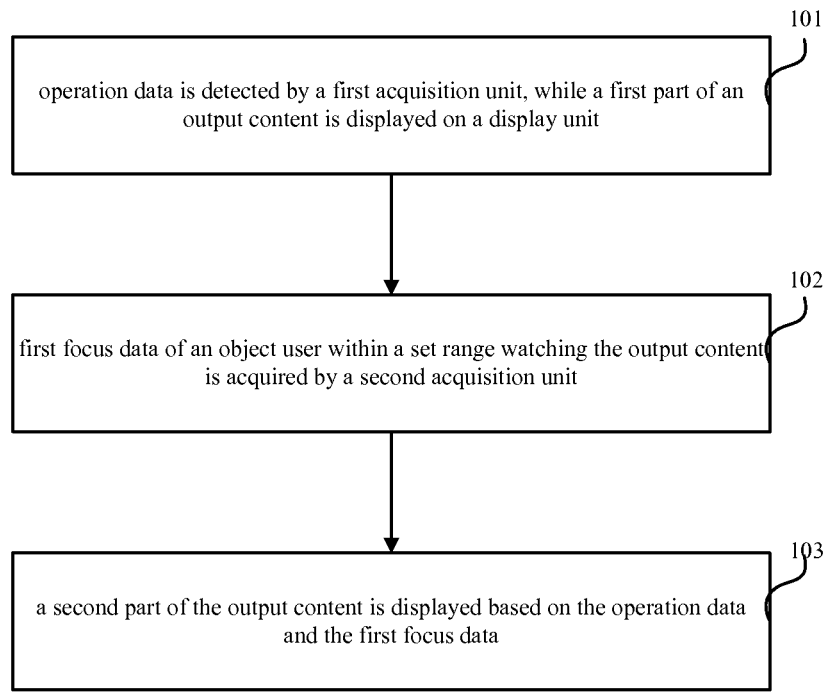
FIG. 1 is a schematic flowchart of a display method according to a first embodiment of the disclosure.
Figure 2:
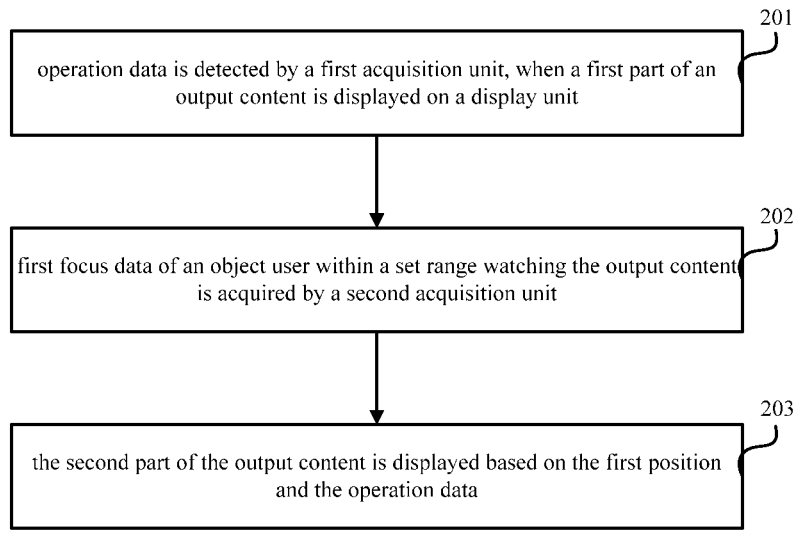
FIG. 2 is a schematic flowchart of a display method according to a second embodiment of the disclosure.

In the conventional condition, to perform some operations with inertial characteristics (such as page turning or screen scrolling), when a user adjusts the displayed content over a long range with the roller of the mouse, or, the up key or the down key in the keyboard, the asynchronization between the reading of the user and the variation of the displayed content may occur, thus the operation performed by the user become invalid.

For convenience of adjusting a displayed content over a long range, it is provided a display method in an embodiment of the disclosure, and the method includes:

detecting, by a first acquisition unit, operation data, while a first part of an output content is displayed on a display unit;

acquiring, by a second acquisition unit, first focus data of an object user within a set range watching the output content, wherein the focus data indicates a position of the display unit corresponding to a focus of the object user; and displaying a second part of the output content, based on the operation data and the first focus data, wherein the second part is different from the first part.

In the method provided in an embodiment of the disclosure, after the operation data is detected by the first acquisition unit (that is, the operation with inertial characteristics is detected), the focus data of the user is further detected, where the focus data indicates a position of a displayed content watched by the user. The first focus data needs to be taken into consideration when the displayed content is adjusted based on the operation data in the device. That is to say, reference needs to be made to the focus data when the displayed content is adjusted in the device, so that the adjusted displayed content is synchronized with the reading or the sight line of the user, thereby preventing the operation of the user from becoming invalid.

Various embodiments and various aspects of the disclosure will be described hereinafter referring to details as follows. In the drawings, various embodiments are illustrated. Descriptions and drawings as follows are illustrative description of the disclosure, and should not be deemed as to limit the disclosure. An amount of specific details are described for providing thorough understanding in the various embodiments of the disclosure. However, in some cases, known or conventional details will not be described, for providing brief description of the embodiment of the disclosure.

Hereinafter, some parts of the embodiments are shown in a form of algorithms which include operations performed on data stored in a memory of a computer. Generally, the algorithm refers to a self-consistent sequence of the operations causing the desired result. These operations typically require or involve physical manipulation or physical quantity. Usually (but not necessarily), these quantities take the form of electrical or magnetic signals capable of being stored, transmitted, combined, compared, and otherwise manipulated. It has been proved, it is convenient to refer these signals to be bits, values, elements, symbols, characters, terms, numbers and the like (mainly for reasons of usual use) sometimes.

It should be kept in mind that all of these and similar terms are associated with appropriate physical quantities and are merely convenient labels for these quantities. Hereinafter, unless clearly stated hereinafter, throughout the specification, instructions carried out by the term such as "processing", "computing", "determining" or "displaying" may refer to an operation and process performed by a data processing system or similar electronic device, where the operation and process manipulates the data represented as physical (digital) quantities in the register and memory of the computer and converts it into other data represented as the physical quantities similarly in the memory or register (or other such information storage, transmission or display devices) of the system.

The present disclosure may refer to a device configured to perform one or more of the operations in the disclosure. The device may be constructed specifically for the desired purposes, or may include a general purpose computer which is selectively activated or reconfigured by a computer program stored in the computer. Such a computer program may be stored in a machine (e.g., computer) readable medium, or stored in any type of medium suitable for storing electronic instructions and each coupled to the bus. The computer-readable medium includes, but is not limited to any type of disk (including a floppy disk, an optical disk, a CD-ROM, and a magneto-optical disk), a read-only memory (ROM), a random access memory (RAM), an erasable programmable ROM (EPROM), an electrically erasable programmable ROM (EEPROM), a flash memory, a magnetic card, or an optical card.

The machine-readable medium includes any mechanism for storing or transmitting information in a machine (e.g., a computer) readable form. For example, the machine-readable medium includes a read only memory (ROM), a random access memory (RAM), a disk storage media, an optical storage media, a flash memory device, a signal propagated in an electrical, light, sound or other form (e.g., carrier waves, infrared signals, digital signals, etc.) and the like.

First Embodiment

As shown in FIG. 1, a display method is provided in an embodiment of the disclosure. The embodiment of the disclosure will be described in detail in conjunction with the drawings. The display method includes steps 101 to 103 as follows.

In step 101, operation data is detected by a first acquisition unit, while a first part of an output content is displayed on a display unit.

In an embodiment of the disclosure, the displayed content is larger than a display region of the electronic device for implementing the solution of the disclosure, only a part of the displayed content can be displayed in the display region. By performing an operation, the part of the displayed content displayed currently in the display region may be replaced.

The operation corresponding to the operation data is an operation to adjust the displayed content, such as screen scrolling or page turning.

In step 102, first focus data of an object user within a set range watching the output content is acquired by a second acquisition unit, wherein the focus data indicates a position of the display unit corresponding to a focus of the object user.

In an embodiment of the disclosure, there are many methods for determining the first focus data based on the data acquired by the second acquisition unit, such as a method A or B as follows.

In the method A, the second acquisition unit may be a human eye detection engine, and position information of a focus of an eye of a user may be acquired and recorded by the human eye detection engine.

The position information may be acquired as follows. The human eye detection engine obtains image information of an object user, detects an eye image in the image information, compares the obtained image with stored initial images, and determines the position of the focus of the user based on the eye image. The initial images may be an image obtained when the user is instructed to watch different preset positions (such as four corners) by prompt information output, during initialization of the detection engine.

In the method B, the second acquisition unit may be an image acquisition unit array provided in a position corresponding to the position of the display unit. Each acquisition unit in the image acquisition unit array corresponds to a coordinate point in the display unit. The information of the user may be acquired by the image acquisition unit array simultaneously. The information acquired by each acquisition unit is detected, an object acquisition unit detecting the user watching the display unit straightly or directly is determined. The coordinate point corresponding to the object acquisition unit is taken as the position of the focus of the user, and thus the position information of the focus of the eye of the user is determined.

In step 103, a second part of the output content is displayed based on the operation data and the first focus data, wherein the second part is different from the first part.

In an embodiment of the disclosure, the first part and the second part are contents displayed in the display unit under different conditions respectively. There are many cases in which the first part is different from the second part. For example, the first part overlaps the second part partially, or the first part is totally different from the second part (that is to say, the area of the region occupied by the second part is not smaller than the display area of the display unit).

In the method provided in an embodiment of the disclosure, after the operation data is detected by the first acquisition unit (that is, the operation with inertial characteristics is detected), the focus data of the user is further detected, where the focus data indicates a position of a displayed content currently watched by the object user. The first focus data needs to be taken into consideration when the displayed content is adjusted based on the operation data by the device. That is to say, reference needs to be made to the focus data when the displayed content is adjusted in the device, so that the adjusted displayed content is synchronized with the reading or the sight line of the user, thereby preventing the operation of the user from becoming invalid.

Second Embodiment

The range over which the displayed content may be adjusted based on the focus data in conjunction with the operation data of the user, so that the variation of the displayed content is synchronized with the reading speed of the user. For example, coordinates in the screen watched by the human eye is obtained by using the human eye detection technique. When the focus varies in the vertical and/or horizontal direction, and operations varying the displayed content (such as screen scrolling operations, operations through a mouse scroll key and operations through the up key or the down key in the keyboard) are performed by the user, the distance to be scrolled over may be determined based on a series of human eye focuses, thereby adjusting the range of the scrolling operation. The specific implementation may include steps 201 to 205 as follows.

In step 201, operation data is detected by a first acquisition unit, while a first part of an output content is displayed on a display unit.

In step 202, first focus data of an object user within a set range watching the output content is acquired by a second acquisition unit, wherein the focus data indicates a position of the display unit corresponding to a focus of the object user.

In step 203, a first position of the display unit corresponding to the focus of the object user is determined based on the first focus data; and the second part of the output content is displayed based on the first position and the operation data. The second part is different from the first part.

In this embodiment, the difference between the first part and the second part is determined based on the first position. For the same operation data, if the second acquisition unit acquires second focus data different from the first focus data (that is to say, the first position is different from the second position corresponding to the second focus data), the second part corresponding to the first focus data is different from the second part corresponding to the second focus data.

For example, for the document page turning operation, if the first position is at ¼ of the display unit, the displayed content is adjusted by ¼ of a whole page in each page turning operation; and if the first position is at ½ of the display unit, the displayed content is adjusted by ½ of the whole page in each page turning operation. In an embodiment of the disclosure, in step 202, the first focus data may be acquired by the second acquisition unit periodically, and the output content is adjusted correspondingly once variation of the focus data, as compared to the previous moment, is detected.

In a specific embodiment, the displaying the second part of the output content, based on the first position and the operation data may include:

A, determining a first distance between the first position and a boundary of the display unit; and B, displaying the second part of the output content based on the operation data and the distance.

In this embodiment, the first distance may be indicated by a vector. The length of the vector is the length of a line segment between the first position and the second position. The direction of the vector is the direction from the first position to the second position. In a specific instance, if the operation data corresponds to the screen scrolling operation, not only variation of the displayed content may be adjusted not only in the up-down direction, but also in the left-right direction.

The displaying the second part of the output content, based on the operation data and the distance, may include steps b1 to b3 as follows.

In step b1, a first adjustment range corresponding to the first distance is determined based on a preset correspondence between the distance and the adjustment range, wherein the adjustment range indicates a difference between the second part and the first part.

In a specific instance, the correspondence between the distance and the adjustment range may be a directly-proportional relation. That is to say, the larger the distance is, the greater the range of the corresponding adjustment is. For example, if the operation data corresponds to a screen scrolling operation, the larger the distance is, the faster the corresponding screen scrolling is; and if the operation data corresponds to a page turning operation, the larger the distance is, the faster the speed for turning the page correspondingly is.

The difference is used to determine the quantity of the different contents between the first part and the second part.

In step b2, the second part of the content to be displayed is determined based on the first adjustment range and the first part.

In step b3, the second part of the output content is displayed based on the operation data.

In this embodiment, the effect of the operation corresponding to the operation data may be adjusted based on the focus data, thus the displayed content that is adjusted based on the focus data in conjunction with the operation data may be consistent with the variation of the displayed content acceptable to the user, so that the reading efficiency of the user is increased and invalid operations of the user are reduced.

In a specific instance, the user performs the screen scrolling operation to adjust the currently-displayed content, 30% of the content displayed on the display unit is updated in each screen scrolling operation, and the second acquisition unit further acquires second focus data. If the second focus data is the same as the first focus data (that is to say, the first position is the same as the second position corresponding to the second focus data), still 30% of the displayed content is updated in each screen scrolling operation. If the second focus data is different from the first focus data, 35%, for example, of the displayed content may be updated based on a preset rule, to accommodate the updating range of the reading rate of the object user. The data in the above embodiment is only illustrative, and may be adjusted based on the requirement of the user in a specific embodiment, which does not limit the method of the disclosure.

Further, in this embodiment, the updating range of the displayed content may be adjusted based on the distance between the focus of the object user and a boundary of the display unit. In an optional instance, the updated range is in direct proportion to the distance, that is to say, the larger the distance is, the greater the updating range. The smaller the distance between the first focus data and the second focus data, the smaller the difference between the first part and the second part.

In this embodiment, the displayed content that has been read is adjusted to be outside of the display region by the electronic device, based on the focus of the user, so that if the user habitually reads only half page, half page is updated in each page turning operation or each screen scrolling operation, and if the user habitually reads a whole page, a whole page is updated in each page turning operation or each screen scrolling operation. With the method in which the displayed content is adjusted based on the habit of the user, the reading efficiency of the user is improved and the display is adjusted consistent with the reading habit of the user, thereby improving user experience.

Third Embodiment

Figure 3:
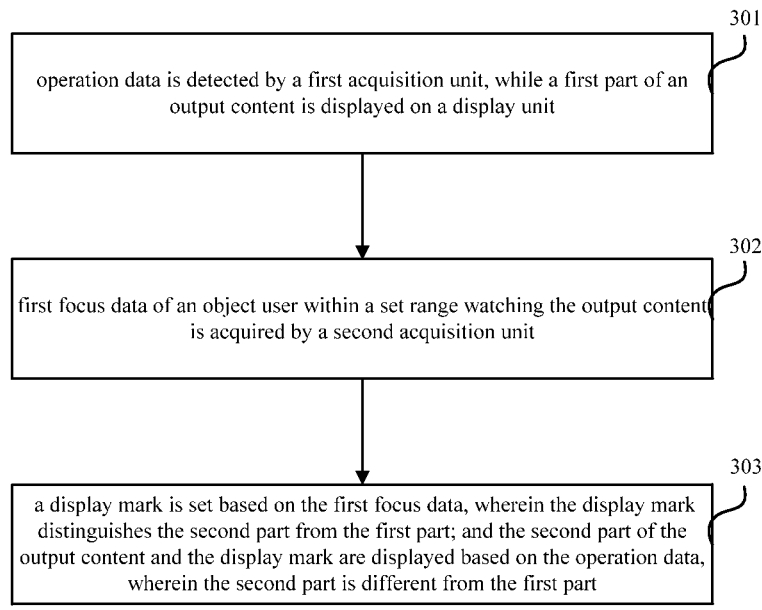
FIG. 3 is a schematic flowchart of a display method according to a third embodiment of the disclosure.

By using the human eye detection technique, coordinates in the screen watched by the human eye is obtained. When the focus varies in the vertical direction, the content before and after the variation is identified by a display mark, thereby improving the watching efficiency. The specific implementation includes steps 301 to 303 as follows (as shown in FIG. 3).

In step 301, operation data is detected by a first acquisition unit, while a first part of an output content is displayed on a display unit.

In step 302, first focus data of an object user within a set range watching the output content is acquired by a second acquisition unit, wherein the focus data indicates a position of the display unit corresponding to a focus of the object user.

In step 303, a display mark is set based on the first focus data, wherein the display mark distinguishes the second part from the first part; and the second part of the output content and the display mark are displayed based on the operation data, wherein the second part is different from the first part.

The setting a display mark based on the first focus data may include:

determining a third position of the display unit corresponding to the first focus data; and providing the display mark at the third position.

In a specific instance, the display mark may be set by using various methods, such as a method A or B as follows.

In a method A, a first content in a set length is selected by taking a third position as a center, and the display effect of the first content is adjusted to be in a first display state, where the first display state is different from the display effect of a part other than the first content in the display unit.

Alternatively, as desired, the first content may be provided at the tail of the first part, may be provided at the head of the second part, or may be provided at both the tail of the first part and the head of the second part.

In a method B, one mark is added between the first part and the second part. The mark may be a mark capable of distinguishing the first part from the second part, such as a separating line.

In this embodiment, a display mark is provided between the first part and the second part based on the focus data, so that the user distinguishes the second part from the first part based on the display mark. When the content output on the display unit is varied, the user may determine the starting position of the updated content based on the display mark soon, thereby facilitating the user to quickly find the content to watch and improving the reading efficiency of the user.

In the embodiments of the disclosure, the above second and third embodiments may be combined. For example, for the screen scrolling operation, the speed for scrolling the screen may be adjusted using the solution provided in the second embodiment, and the displayed contents during the adjustment are distinguished by using the solution provided in the third embodiment.

Fourth Embodiment

Figure 4:
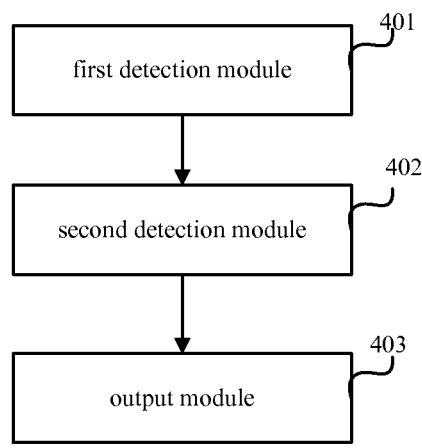
FIG. 4 is a schematic structural diagram of an electronic device according to a fourth embodiment of the disclosure.

As shown in FIG. 4, an electronic device is further provided in an embodiment of the disclosure, based on the above method, and the electronic device includes a first detection module 401, a second detection module 402 and an output module 403.

The first detection module 401 is configured to detect, by a first acquisition unit, operation data while a first part of an output content is displayed on a display unit.

In this embodiment, the first acquisition unit may be any device capable of receiving the operation data input by the user, such as a mouse, a keyboard, a touch screen or a touch panel. The first acquisition unit may be a device integrated with the electronic device in the embodiment of the disclosure, or may be an external device connected to the electronic device via a wired or wireless manner. If the first acquisition device is an external device, the electronic device may send a corresponding control instruction to the first acquisition unit, to acquire the operation data, for controlling the first acquisition unit to acquire the operation data needed by the electronic device.

The second detection module 402 is configured to acquire, by a second acquisition unit, first focus data of an object user within a set range watching the output content, wherein the focus data indicates a position of the display unit corresponding to a focus of the object user.

In this embodiment, the second acquisition unit may be a human eye detection engine, an eye tracker or the like. The second acquisition unit may be a device integrated with the electronic device in the embodiment of the disclosure, or may be an external device connected to the electronic device via a wired or wireless manner. Further, the second acquisition unit may be an image acquisition unit array provided at a position corresponding to a position of the display unit.

The output module 403 is configured to display a second part of the output content, based on the operation data and the first focus data, wherein the second part is different from the first part.

The range of the variation of the displayed content may be adjusted by using the focus data in conjunction with the operation data of the user, so that the variation of the displayed content is synchronized with the reading speed of the user. For example, coordinates in the screen watched by the human eye is obtained by using the human eye detection technique. When the focus varies in the vertical direction, and operations for varying the displayed content (such as screen scrolling operations, operations through a mouse scroll key, and operations through the up key or the down key in the keyboard) are performed by the user, the distance to be scrolled over may be determined based on a series of human eye focuses, and converted to a range to be scrolled over, thereby the range to be scrolled over is adjusted.

Optionally, the output module 403 is configured to determine a first position of the display unit corresponding to the focus point of the object user, based on the first focus data; and display the second part of the output content, based on the first position and the operation data.

Optionally, the output module includes a positioning unit and an adjustment unit.

The positioning unit is configured to determine the first position of the display unit corresponding to the focus of the object user, based on the first focus data.

The adjustment unit is configured to determine a first distance between the first position and a boundary of the display unit, and display, based on the operation data and the distance, the second part of the output content.

In addition, by using the human eye detection technique, coordinates in the screen watched by the human eye is obtained. When the focus varies in the vertical direction, the content before and after the variation is identified by a display mark, thereby improving the reading efficiency. Optionally, the output module 403 includes a setting unit and an identification unit.

The setting unit is configured to set a display mark, based on the first focus data, wherein the display mark distinguishes the second part from the first part.

The identification unit is configured to display the second part of the output content and the display mark, based on the operation data.

Further, the setting unit sets a display mark, based on the first focus data, via steps as follows:

determining, by the setting unit a third position of the display unit corresponding to the first focus data, and providing the display mark at the third position.

Fifth Embodiment

Figure 5:
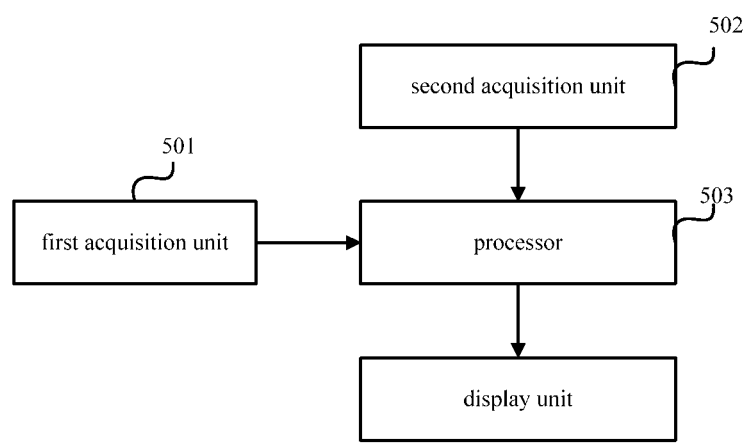
FIG. 5 is a schematic structural diagram of an electronic device according to a fifth embodiment of the disclosure.

As shown in FIG. 5, it is further provided another electronic device in an embodiment of the disclosure, based on the above method, and the electronic device includes a first acquisition unit 501, a second acquisition unit 502 and a processor 503.

The first acquisition unit 501 is configured to acquire operation data while a first part of an output content is displayed on a display unit.

In this embodiment, the first acquisition unit may be any device capable of receiving the operation data input by the user, such as a mouse, a keyboard, a touch screen or a touch panel. The first acquisition unit may be a device integrated with the electronic device in the embodiment of the disclosure, or may be an external device connected to the electronic device via a wired or wireless manner. If the first acquisition device is an external device, to acquire the operation data, the electronic device may send a corresponding control instruction to the first acquisition unit, for controlling the first acquisition unit to acquire the operation data needed by the electronic device.

The second acquisition unit 502 is configured to acquire first focus data of an object user within a set range watching the output content, wherein the focus data indicates a position of the display unit corresponding to a focus of the object user.

In this embodiment, the second acquisition unit may be a human eye detection engine, an eye tracker or the like. The second acquisition unit may be a device integrated with the electronic device in the embodiment of the disclosure, or may be an external device connected to the electronic device via a wired or wireless manner. In addition, the second acquisition unit may be an image acquisition unit array provided at a position corresponding to a position of the display unit, and in this embodiment, the second acquisition unit and the display unit may be combined to form one device.

The processor 503 is configured to control the display unit to display a second part of the output content, based on the operation data and the first focus data, wherein the second part is different from the first part.

In this embodiment, the electronic device is a device formed by combining the first acquisition unit, the second acquisition unit, the display unit and the processor. Further, the electronic device in this embodiment may include only the processor, the electronic device is connected to the first acquisition unit, the second acquisition unit and the display unit in a wired or wireless manner, and the electronic device is configured to send a corresponding control instruction to a corresponding functional module when any one of the first acquisition unit, the second acquisition unit and the display unit needs to be used, and receive the data fed back by the corresponding functional module to perform the operation.

Optionally, the processor 503 is configured to determine a first position of the display unit corresponding to the focus of the object user, based on the first focus data; and display the second part of the output content, based on the first position and the operation data.

One or two of the above technical solutions in the embodiments of the disclosure has at least following technical effects.

In the method provided in an embodiment of the disclosure, after the operation data is detected by the first acquisition unit (that is, the operation with inertial characteristics is detected), the focus data of the user is further detected, where the focus data indicates a position of a displayed content currently watched by the object user. The first focus data needs to be taken into consideration when the displayed content is adjusted based on the operation data by the device. That is to say, reference needs to be made to the focus data when the displayed content is adjusted in the device, so that the adjusted displayed content is synchronized with the reading or the sight line of the user, thereby preventing the operation of the user from becoming invalid.

In the solution provided in the second embodiment, the effect of the operation corresponding to the operation data may be adjusted based on the focus data by the device, and thus the displayed content that is adjusted by using the focus data in conjunction with the operation data may be consistent with the displayed content variation acceptable to the user, so that the watching efficiency of the user is increased and the invalid operation of the user is reduced.

In the solution according to the third embodiment, a display mark is provided between the first part and the second part, based on the focus data, so that the user distinguishes the second part from the first part based on the display mark. When the content output on the display unit is varied, the user can quickly determine the starting position of the updated content, based on the display mark, thereby improving the watching efficiency of the user.

The method in the disclosure is not limited to the embodiments in the specific implementations, and other implementations may be obtained by those skilled in the art, based on the technical solution of the disclosure, which still fall within the scope of the technical innovation of the disclosure.

Apparently, various modifications and variations may be made to the disclosure by those skilled in the art, without deviating from the spirit and scope of the disclosure. The disclosure intends to include those modifications and variations if they fall within the scope of the claims of the disclosure and equivalent technology of the disclosure.

The invention claimed is:

1. A display method, comprising:
  detecting operation data when a first part of an output content is displayed on a display unit, wherein the operation data corresponds to an operation for adjusting the displayed output content;
  acquiring focus data relating to a user watching the output content, wherein the focus data indicates a position of the display unit corresponding to a focus of the user;
  displaying a second part of the output content, based on the operation data being detected and the focus data acquired;
  wherein the displaying the second part of the output content comprises:
  determining, based on the focus data, a first position of the display unit corresponding to the focus of the user;
  determining a first distance between the first position and a boundary of the display unit;
  displaying the second part of the output content, based on the determined first distance;
  setting a display mark between the first part and the second part based on the focus data, wherein the display mark is provided at the top of the second part for indicating a starting position of the second part of the output content; and
  displaying the display mark while displaying the second part of the output content.

2. The display method according to claim 1, wherein the displaying the second part of the output content comprises:
  determining a first adjustment range corresponding to the first distance based on a preset correspondence between the first distance and the first adjustment range, wherein the first adjustment range corresponds to a positional adjustment of the output content in order to display the second part of the output content; and
  displaying the second part of the output content, based on the determined first adjustment range.

3. The display method according to claim 2, wherein the correspondence between the first distance and the first adjustment range is direct proportion.

4. The display method according to claim 1, wherein the setting the display mark, based on the focus data, comprises:

determining the position of the display unit corresponding to the focus data; and displaying the display mark at the position of the display unit.

5. The display method according to claim 1, wherein the operation data corresponds to a scrolling operation performed on any one device selected from a group of devices comprising: a mouse device; a keyboard; and a touch screen.

6. An electronic device, comprising:
a first detection module, configured to detect operation data while a first part of an output content is displayed on a display unit, wherein the operation data corresponds to an operation for adjusting the displayed output content;
a second detection module, configured to acquire focus data of a user watching the output content, wherein the focus data indicates a position of the display unit corresponding to a focus of the user; an output module, configured to display a second part of the output content based on the operation data being detected and the focus data acquired; and
wherein the output module is further configured to:
determine a first position of the display unit corresponding to the focus of the user based on the focus data;
determine a first distance between the first position and a boundary of the display unit;
display the second part of the output content based on the determined first distance;
set a display mark between the first part and the second part based on the focus data, wherein the display mark is provided at the top of the second part for indicating a starting position of the second part of the output content; and
display the display mark while displaying the second part of the output content.

7. The electronic device according to claim 6, wherein the operation data corresponds to a scrolling operation performed on any one device selected from a group of devices comprising: a mouse device; a keyboard; and a touch screen.

8. An electronic device, comprising:
a first acquisition unit, configured to acquire operation data, when a first part of an output content is displayed on a display unit, wherein the operation data corresponds to an operation for adjusting the displayed output content;
a second acquisition unit, configured to acquire focus data of a user watching the output content, wherein the focus data indicates a position of the display unit corresponding to a focus of the user;
a processor, configured to control the display unit to display a second part of the output content based on the operation data and the focus data; and
wherein the processor is configured to:
determine, based on the focus data, a first position of the display unit corresponding to the focus of the user;
determine a first distance between the first position and a boundary of the display unit;
display the second part of the output content based on the determined first distance;
set a display mark between the first part and the second part based on the focus data, wherein the display mark is provided at the top of the second part for indicating a starting position of the second part of the output content; and
display the display mark while displaying the second part of the output content.

9. The electronic device according to claim 8, wherein the operation data corresponds to a scrolling operation performed on any one device selected from a group of devices comprising: a mouse device; a keyboard; and a touch screen.

* * * * *